Patented Oct. 12, 1954

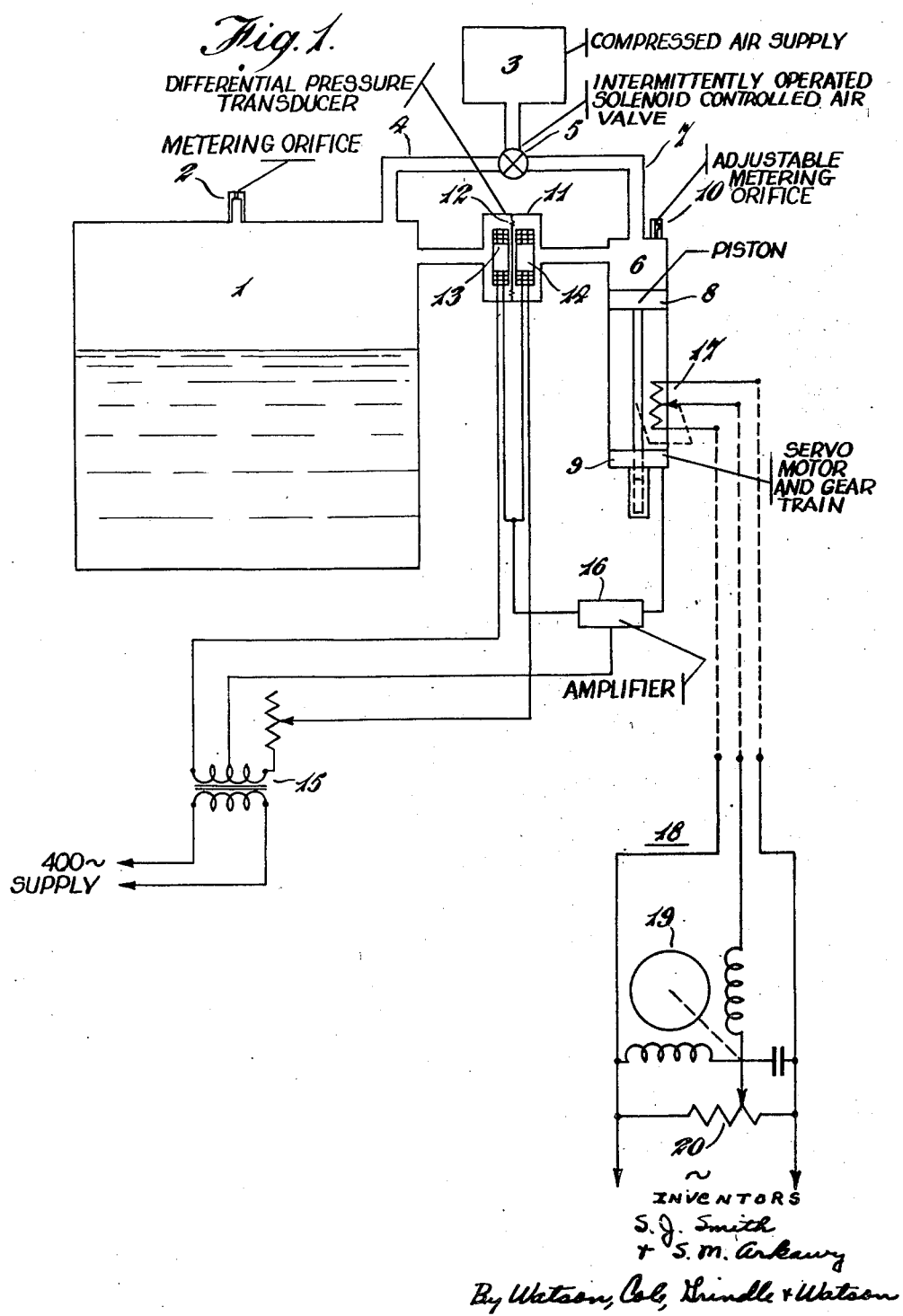

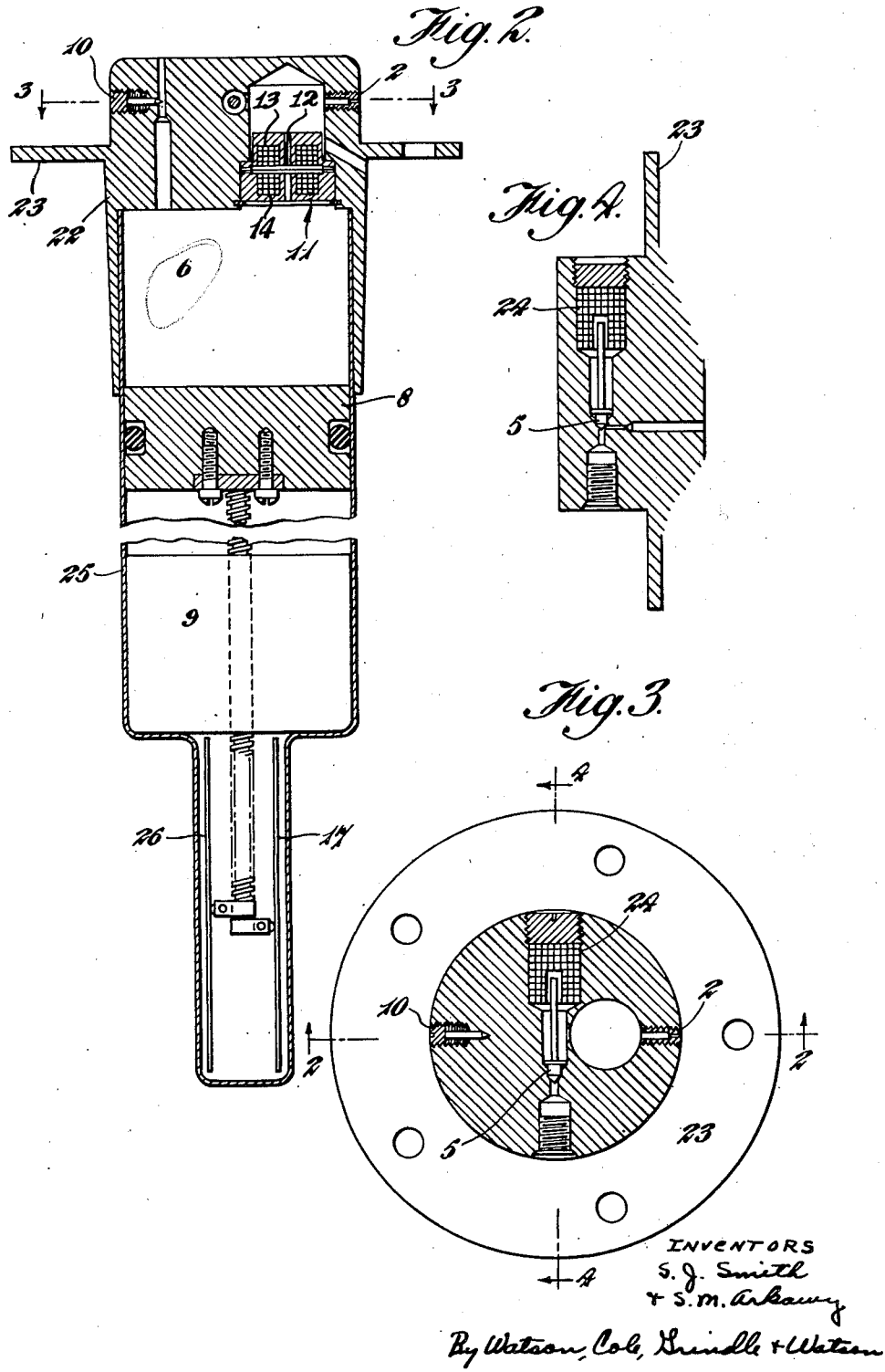

2,691,304

UNITED STATES PATENT OFFICE 2,691,304

LIQUID CONTENTS GAUGE

Stanley James Smith, Ossining, and Seymour M. Arkawy, Peekskill, N. Y., assignors to Simmonds Aerocessories, Inc., Tarrytown, N. Y., a corporation of New York Application April 20, 1951, Serial No. 222,092

8 Claims. (Cl. 73—290)

This invention relates to an improved gauge of measuring the volume, or if desired the mass, of liquid in a container for example the fuel tank of an airplane. For such applications the requirements are very severe inasmuch as the gauge should be unaffected by changes in attitude, altitude or changes in temperature over wide ranges. Moreover the gauge should be easily applied whatever the size or shape of the container may be. Many solutions of this problem have been put forward but hitherto they have suffered from serious defects such as lack of accuracy or undue complexity which render them unsuitable for practical use.

The present invention has for its principal object the provision of an improved liquid contents gauge the application and accuracy of which is unaffected by either the shape, attitude or altitude of the container for the liquid.

More specifically the present invention has for an object the provision of a system for measuring the volume of free air in a fluid-tight container housing a liquid, and hence the volume of the liquid.

Other objects and advantages of the gauge system of this invention will become apparent during the course of the following description with reference to the accompanying drawings, in which Figure 1 is a schematic diagram of the gauge system;

Figure 2 is a cross-sectional view taken on line 2—2 of Fig. 3, of a unit of the gauge system which is mounted on the container for the liquid;

Figure 3 is a cross-sectional view on the line 3—3 in Fig. 2, and

Figure 4 is a fragmentary cross-sectional view on the line 4—4 of Fig. 3.

In the improved gauge system of this invention in addition to the container whose liquid content is to be measured, there is provided a reference container of adjustable volume. Air is admitted to both these containers in the form of a series of short pressure pulses and escapes to atmosphere through an appropriately sized orifice in each container so that during the interval between the pulses the air pressure in the two containers falls. Conveniently the size of the two orifices is so chosen that with the liquid container empty and the reference chamber at maximum volume the rate of pressure decay in the two chambers will be equal. If now the air volume of the liquid container is reduced owing to the presence of liquid in the container the rates of pressure decay in the two chambers will no longer be equal and if a differential pressure transducer is connected between the two chambers a signal will be obtained which may be applied to control means which change the volume of the reference chamber until the rates of pressure decay in the two chambers are again equal.

Accordingly the change in volume of the reference chamber may be made proportionate to the change in air volume of the liquid container and the movement of the volume-adjusting means for the reference chamber may thus be made representative of the liquid content. By the use of density measuring equipment the liquid volume indication so obtained may be converted in terms of the mass of liquid.

The operation of the system will be unaffected by changes in ambient air pressure and is of course unaffected by changes in attitude of the liquid container.

One form of gauge system in accordance with this invention will be explained with reference to Fig. 1 in which the basic elements are illustrated in schematic form. These comprise a main liquid container 1 provided with a metering orifice 2 and connected with a supply 3 of pressure air through the pipe 4 and valve 5. The reference container 6 which is also connected with the pressure air supply 3 through the valve 5 and a pipe 7 is of cylindrical shape and is provided with a piston 8 which is movable to alter the volume of the container by means of a servomotor and gear train arranged at 9. The reference container 6 is also provided with a metering orifice 10 which is preferably adjustable.

A differential pressure transducer 11 is connected between the two containers 1 and 6 so as to respond to differences in the rate of pressure decay therein. This transducer consists of a flexible metal diaphragm 12, which divides a space connected with the container 1 from a space connected with the reference chamber 6, and two coils 13, 14 mounted on cores of high permeability which together with the diaphragm 12 constitute a form of microphone.

The two coils 13, 14 are connected in a bridge circuit with the secondary winding of a transformer 15, the primary of which is excited from a suitable source of alternating current, on airplanes conveniently the usual 400 C. P. S. supply. With the bridge circuit balanced if there is a difference in pressure on the two sides of the diaphragm 12 it will move towards one coil and away from the other. The consequent change in reluctance of the magnetic circuit will vary the inductance of the coils and hence the bridge balance will be upset. A resultant signal reflecting the phase and magnitude of the displacement of the diaphragm will be produced which after amplification in the amplifier 16 is applied to a discriminator tube to control the operation of the servomotor such that the piston 8 is moved to control the volume of the reference container 6 until balance is restored. The piston 8 is mechanically coupled with a potentiometer 17 or other suitable transducer (see Fig. 2 for details) which is arranged to operate an output display 18 indicating liquid quantity. As shown this apparatus comprises a split phase motor 19 which is arranged to drive indicating means and a potentiometer 20 in known manner so as to follow the movement of the potentiometer 17.

In the operation of the system air from the supply 3 is admitted into the container 1 and the reference container 6 in the form of short pulses by the operation of the valve 5. This valve may be opened by means of a solenoid which is energised periodically by means of a thermal cycling device or other convenient means.

The air flow required by the system just described may be determined by consideration of the sensitivity of the pressure transducer, the volume of the containers and the orifice areas. The pressure transducer is in the form of a microphone which may be readily operated by pressure waves in the same order of magnitude as audible sound waves. The Smithsonian Physical Tables state that the maximum audible sound waves are at a pressure of 1000 dynes per square centimeter which is also of sufficient magnitude to excite the tactile nerves of the fingertips. This pressure, which corresponds to 0.000348 pound/square inch may then be considered more than ample to excite the transducer. Further, it is necessary that the air pressure on the transducer diaphragm be of a much higher order of magnitude than the acceleration effects on the diaphragm mass. Considering a steel diaphragm of 0.001 inch thickness, its weight would be 0.000288 pound/square inch. To maintain a 1% accuracy over a range of accelerations of 1g the air pressure must be 100 times the diaphragm weight or 0.0288 pound/weight inch. For preliminary design, a pressure of 0.05 p. s. i. will be used. For an effective orifice diameter of 0.05 inch or 0.000014 square foot, the air flow will be:

$$f = a \frac{\sqrt{2 \times (P_1 - P_2)}}{D}$$

where $f$ = air flow (cu. ft./sec.)
$a$ = effective orifice area (sq. ft.)
$P_1 - P_2$ = pressure difference (lbs./sq. ft.)
$D$ = air density (slugs/cu. ft.)

Substituting the values given $$f = 0.000014 \sqrt{\frac{2 \times 0.05 \times 144}{0.00238}}$$

$$= 0.0011 \text{ cu. ft./sec.}$$

Since a particular aircraft engine when idling pumps about 150 cu. ft./sec. of air, the 0.0011 cu. ft./sec. may be readily drawn from the compressor discharge.

For ground operation, when the engine is not running, a separate air source must be used. A small low pressure accumulator will provide intermittent gauge operation. For example, consider a 2000 gallon tank. The total volume is 267 cu. ft., so that five minutes of operation requires 300×0.0011 or 3.3 cu. ft. An accumulator pressurized to 50 p. s. i. or 3.3 atmospheres would then require a capacity of 1 cu. ft.

The details of a preferred embodiment of the elements illustrated in Fig. 1 will now be described with reference to Figs. 2, 3 and 4 which show a particular constructional embodiment of a sensing element comprising a solenoid-operated air valve, and the reference container, with its adjustable piston, the driving means therefor and an output transducer, the whole being adapted for mounting on a liquid container. Parts corresponding with those schematically illustrated in Fig. 1 bear the same reference numeral.

The element comprises a housing 22 which is formed with a mounting flange 23 and accommodates in its head portion the metering orifice 2 for the main container, the metering orifice 10 for the reference container, the valve 5 in the main air supply together with an operating solenoid 24, and the differential pressure transducer 11. The reference container 6 is constituted by the space included between the head portion of the housing 22 and the piston 8 which is movable in a cylindrical shell 25 carried by the housing. The driving servomotor for the piston is accommodated in the space 9 and in the lowest portion of the shell 25 are arranged two transducers 17, 26 conveniently potentiometers which are operated by means of a rod secured to the piston 8. The transducer 17 is arranged to operate the output display as above described and the transducer 26 may be used to operate a totalising or a control function as required.

In view of the relatively large amount of power available and the physical size of the sensing element which comprises the air valve orifices, reference container and servo-mechanism, it is possible to make the output transducer or potentiometer 17 large enough to dissipate a considerable amount of energy permitting an output display indicator to be directly driven without the use of a vacuum tube amplifier.

Assuming accurate determination of liquid quantity present in one or more tanks such fuel quantities being defined or displayed by a relatively robust mechanical positioning, it becomes a relatively simple matter to accomplish any desired control or computing functions. The large output signal obtainable for reasons explained in the preceding paragraph is a considerable aid in this connection as it is possible directly to operate reasonably robust relays without further amplification; control of fuel pumps or valves can be readily accomplished and the linearity of the system and its independence of tank contour permits of combination of signals to operate range and endurance computing devices.

Although the gauge system of the present invention has been devised for the measurement of fuel in the fuel tanks of airplanes, for which purpose it has many advantages over other gauging systems of the prior art, it will be appreciated that the invention is in no way limited to this application and that it may be used wherever it is required to measure the liquid content of a container. Moreover by the provision of means for measuring the density of the liquid, for example by means of the device of co-pending application Serial No. 155,192, the system of the present invention may be adapted for measuring the mass of liquid in a container.

We claim:

1. A liquid contents gauge comprising a liquid container, a reference container of adjustable volume, means for supplying periodically air in short pressure pulses to said containers, to reduce the pressure differential, if any, between said containers, a metering orifice in each container for exhausting pressure air to atmosphere, a differential pressure transducer connected between said containers, means responsive to the output from said transducer for continuously varying the volume of the reference container to equalise the rate of pressure decay in the two containers and means for providing an indication proportional to the volume of said reference container.

2. A liquid contents gauge comprising a liquid container, a reference container of adjustable volume, means for supplying air in the form of short pressure pulses to both containers, a metering orifice in each container for exhausting pressure air to atmosphere, a differential pressure transducer connected between said containers, said transducer comprising two generating windings, a bridge circuit including said windings, means responsive to unbalance conditions in said bridge circuit for altering the volume of said reference container to restore balance, and means responsive to the volume of said reference container for indicating the contents of said liquid container.

3. A liquid contents gauge comprising a liquid container, a reference container of adjustable volume, means for supplying air in the form of short pressure pulses to both containers, a metering orifice in each container for exhausting pressure air to atmosphere, a differential pressure transducer connected between said containers, said transducer comprising two generating windings, a bridge circuit including said windings, means responsive to unbalance conditions in said bridge circuit for altering the volume of said reference container to restore balance, and means for producing a signal proportional to the volume of said reference container.

4. A liquid contents gauge comprising a liquid container, a reference container of adjustable volume, a source of pressure air, means for supplying air from said source in periodic pulses to both said containers to reduce the pressure differential, if any, between said containers, a metering orifice in each container for exhausting pressure air to atmosphere, means for varying the volume of said reference container until the rate of pressure decay in each container is equal, and means for varying a signal representative of liquid volume in accordance with the volume of said reference container.

5. A liquid contents gauge for measuring the quantity of liquid in a liquid container, comprising a reference container of adjustable volume, valve means included in an air passage for connection between said reference container and said liquid container, said valve means being additionally arranged to be connected with a supply of air under pressure, said valve when in one position being arranged to allow air from said supply to pass to both containers, and when in another position being arranged to preclude the passage of air between said containers, a metering orifice for each container for exhausting pressure air, a differential pressure transducer for connection between said containers, means responsive to the output from said transducer for varying the volume of the reference container, and means for indicating the volume of said reference container.

6. A device for sensing the quantity of liquid in a liquid container, comprising a reference container of adjustable volume, valve means included in an air passage for connection between said reference container and said liquid container, said valve means being additionally arranged to be connected with a supply of air under pressure, said valve when in one position being arranged to allow air from said supply to pass to both containers, and when in another position being arranged to preclude the passage of air between said containers, a metering orifice for each container for exhausting pressure air, a differential pressure transducer for connection between said containers, means responsive to the output from said transducer for varying the volume of the reference container inversely with respect to the quantity of said liquid, and control means responsive to variation in volume of said reference container.

7. A device for sensing the quantity of liquid in a liquid container as set forth in claim 6, wherein said differential pressure transducer comprises two inductive windings, and said means responsive to the output from said transducer comprises an electrical bridge circuit including said windings.

8. A device for sensing the quantity of liquid in a liquid container, comprising a reference container of adjustable volume, means for supplying air in the form of short pressure pulses to both containers, a metering orifice for connection to each container for exhausting pressure air, a differential pressure transducer connected between said containers, said transducer comprising two generating windings, a bridge circuit including said windings, and means responsive to unbalance conditions in said bridge circuit for altering the volume of said reference container to restore balance.

References Cited in the file of this patent

UNITED STATES PATENTS

| Number | Name | Date |
|---|---|---|
| 2,116,636 | Neumann | May 10, 1938 |
| 2,168,106 | Saur | Aug. 1, 1939 |
| 2,378,849 | Helleberg | June 19, 1945 |
| 2,381,821 | Helleberg | Aug. 7, 1945 |